March 21, 1961 R. L. FISCHER 2,975,794
CONSTANT SPEED PROPELLER GOVERNOR HAVING PROPELLER
SPEED AND ACCELERATION SENSITIVITY
Filed Oct. 22, 1957

INVENTOR
RICHARD L. FISCHER
BY Vernon F. Hauschild
ATTORNEY

United States Patent Office 2,975,794
Patented Mar. 21, 1961

2,975,794
CONSTANT SPEED PROPELLER GOVERNOR HAVING PROPELLER SPEED AND ACCELERATION SENSITIVITY

Richard L. Fischer, Suffield, Conn., assignor to United Aircraft Corporation, East Hartford, Conn., a corporation of Delaware Filed Oct. 22, 1957, Ser. No. 691,755

6 Claims. (Cl. 137—48)

This invention relates to propellers having variable pitch blades and more particularly to governors for use therewith which hold the propeller speed constant by varying propeller pitch as a function of propeller speed and acceleration.

It is an object of this invention to provide a constant speed governor for use with an aircraft propeller which is both propeller speed and acceleration sensitive.

It is a further object of this invention to teach a constant speed propeller governor which utilizes a pilot valve which is positioned as a function of propeller speed in conjunction with a pitch change valve which is hydraulically actuated by the pilot valve with substantial force amplification and which, with the pilot valve, directs fluid to a propeller blade pitch changing means, in conjunction with propeller acceleration sensing means responsive to pilot valve velocity to apply a biasing force proportional to propeller acceleration to the pilot valve.

It is still a further object of this invention to provide a constant speed governor for aircraft propellers with improved control of transient offspeed magnitude and damping time and improved constant speed governing with no sacrifice to stability.

It is still a further object of this invention to provide oscillation prevention means for our positive feedback governor valves.

It is still a further object of this invention to provide a governor to maintain a propeller of the aircraft type at a constant speed and which changes propeller blade pitch to correct the propeller speed as a function of propeller speed error and propeller speed error rate of change.

It is a further object of this invention to teach a method for measuring velocity in a fluid filled cylinder-piston chamber comprising measuring the pressure change across a restriction in the sole fluid ingress and egress line thereto, which pressure change is caused by piston movement.

These and other objects of this invention will become readily apparent from the following detailed description of the drawing in which.

Figure 1:
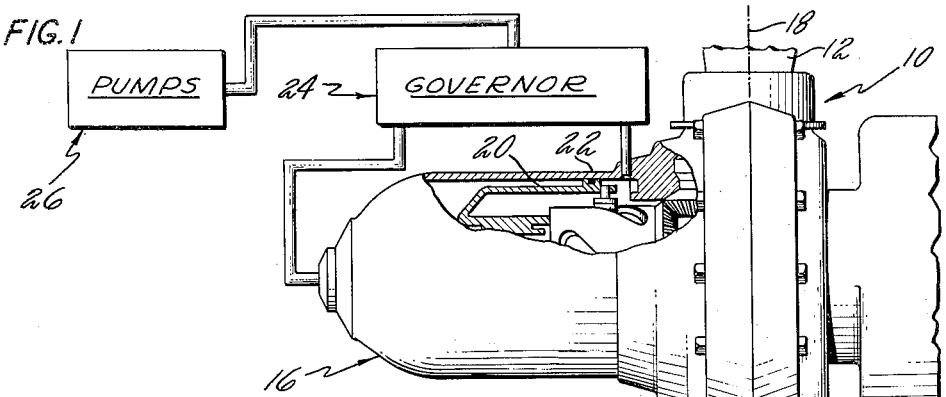
Fig. 1 is a schematic showing of an aircraft engine with a propeller having variable pitch blades and a pitch change motor which is selectively provided by actuating fluid from pumps via a governor.

Referring to Fig. 1 we see modern aircraft propeller unit 10 which is attached to and coacts with modern aircraft engine 11 and includes a plurality of rotatable propeller blades 12 projecting from and supported for rotation by and with respect to propeller hub 14. Pitch change motor 16 serves the function of causing propeller blades 12 to rotate about their longitudinal axes 18 relative to propeller hub 14, thereby effecting a change in propeller blade pitch angle. Pitch change motor 16 consists basically of a reciprocating piston 20 enclosed within cylinder 22 and piston 20 is caused to move with respect to cylinder 22 by the emission of actuating fluid to one or the other side thereof. The reciprocation of piston 20 with respect to cylinder 22 and hub 14 causes blades 12 to rotate in pitch change fashion by the use of any translation-to-rotation changing media such as cam-roller units. Since propeller construction and pitch change actuation is well known, this description thereof is considered to be sufficient for the purpose of this patent, and reference may be had to U.S. Patent Nos. 2,280,713, 2,280,714, 2,653,668 and 2,758,659 for a more particular description of propeller unit 10 and the actuation of its pitch change motor 16. For a more particular description of engine 11, reference may be had to U.S. Patent Nos. 2,700,946 and 2,711,631. Governor unit 24 serves the function of selectively providing actuating fluid to the proper side of piston 20 to effect pitch increase or decrease as dictated by the constant propeller speed setting of governor unit 24. Pump unit 26 serves the function of providing pressurized actuating fluid to governor 24 for selective transmission to pitch change motor 16. It is believed that this slight description of the coaction between propeller unit 10, governor 24, and pump unit 26 is sufficient for the purpose of this patent since such is not new and is described with great particularity in and reference may be had to U.S. Patents Nos. 2,759,549, 2,782,767 and 2,782,769 for a more particular and detailed description thereof.

Figure 2:
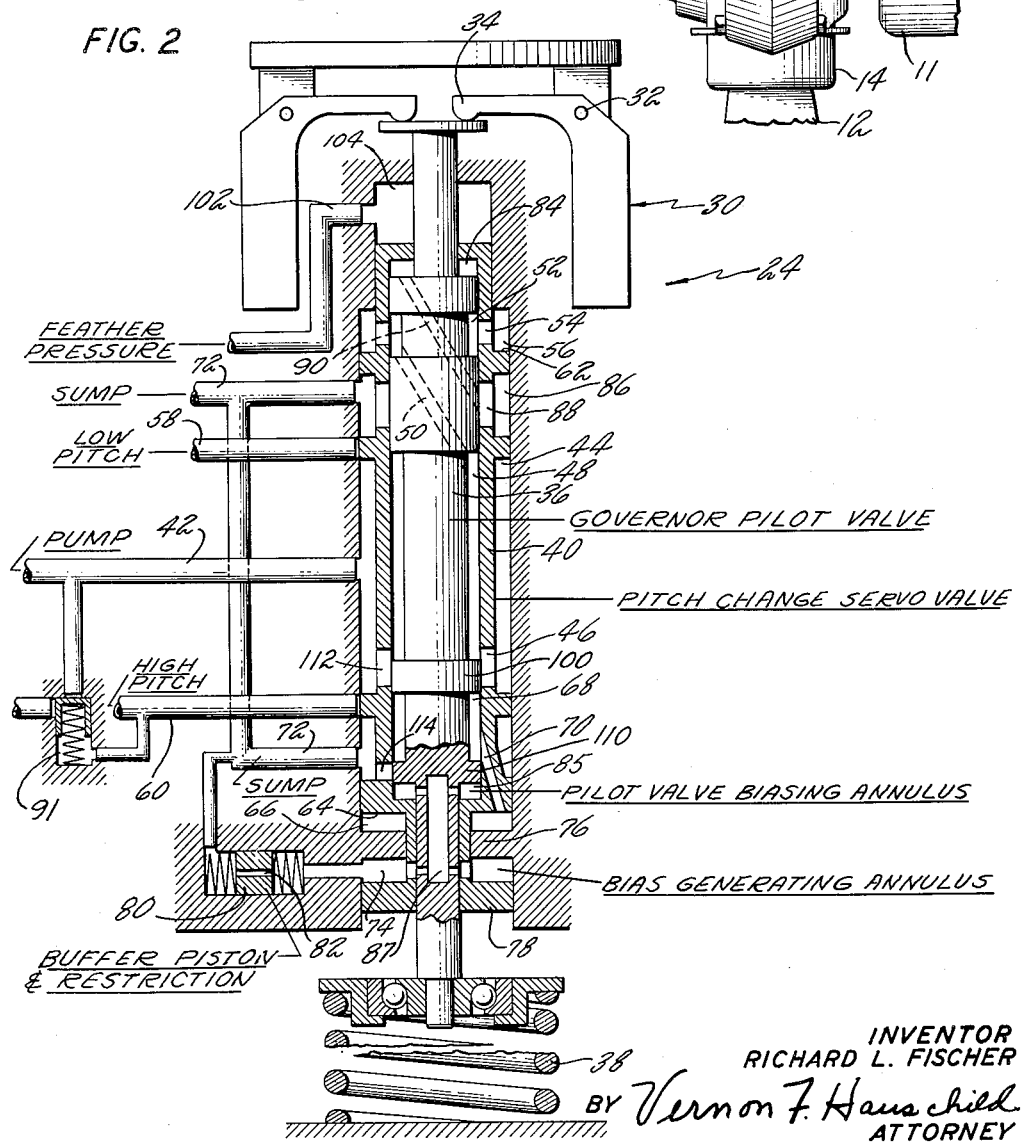
Fig. 2 is a schematic representation of my constant speed, speed and acceleration sensitive propeller governor to demonstrate its flow passages and actuation.

Now referring to Fig. 2 we see a schematic representation of governor unit 24. Speed sensing or flyweight unit 30 is positioned to rotate with or in speed relation to propeller hub 14 so as to pivot about pivot points 32 as a function of the speed of propeller unit 10, thereby imparting a downward force through arms 34 to governor pilot valve 36 in opposition to the force of speeder spring 38 which acts against the opposite end of governor pilot valve 36 from flyweights 30. Adjustable speeder spring 38 is so set that its force is balanced by the force of flyweight unit 30 at the desired propeller speed setting of governor unit 24. When the propeller rotates in an overspeed condition, flyweights 30 move outwardly to force governor pilot valve 36 downwardly against the opposition of speeder spring 38. When propeller 10 rotates in an underspeed condition, the force of speeder spring 38 overcomes the force of flyweight 30 and causes governor pilot valve 36 to move upwardly or away from spring 38. Pitch change servo valve 40 is shown to be fabricated as a sleeve and coaxial and concentric with governor pilot 36, but it should be borne in mind that while this is considered to be the preferable relationship between the two; servo valve 40 need not be concentric with pilot valve 36. The position of servo valve 40 determines the disposition of actuating fluid to pitch change motor 16. Pressurized actuating fluid from pump unit 26 enters line 42 and then passes into annulus 44, through annulus 46 into annulus 48 from hence it flows through aperture 50 into annuli 52, 54, and 56. As servo valve 40 moves upwardly or toward speed sensitive unit 30, it places line 42 into communication with low pitch line 58 through annulus 44. Line 58 leads to the low pitch side of pitch change piston 20 and causes the reciprocation thereof in a direction to rotate propeller blades 12 in a decrease pitch direction. The movement of servo valve 40 toward speeder spring 38 places line 42 into communication with high pitch line 60 through annulus 44. High pitch line 60 leads to the high pitch side of pitch change piston 20 causes reciprocation of piston 20 in a direction to rotate propeller blades 12 in an increase pitch direction.

As mentioned supra, governor pilot valve 36 is positioned or moved as a function of propeller speed or propeller speed error in a position proportionate to the propeller speed or propeller speed error due to the coaction between speeder spring 38 and flyweight unit 30. Pitch change servo valve 40 is hydraulically positioned by governor pilot valve 36 in that the area of surface 62 of annulus 56 is selected to be a particular proportion, preferably one half of the area surface 64 of positioning annulus 66 to effect a force amplification for positioning valve 40 over the speeder spring-flyweight force positioning valve 36. Further, it will be noted that by observing Fig. 2 all of the forces acting on servo valve 40 are canceled out such that servo valve 40 is in equilibrium when the pressure in annulus 56, which is pump pressure, is substantially twice the pressure in positioning annulus 64, which is joined to annulus 68 through line 70. Further, the pressure within positioning annulus 66 is regulated by the admission of either high pressure fluid from annulus 44 or low pressure fluid from line 72 thereto, as dictated by the relative position between pilot valve 36 and pitch change servo valve and, hence, lands 100 and 110 with respect to ports 112 and 114. When pilot valve 36 is caused to move toward speeder spring 38, the pressure in positioning annulus 66 is permitted to bleed through annulus 68 and port 114 to line 72 which is a sump return. This reduction of pressure in positioning annulus 66 causes a pressure unbalance acting on servo valve 40, thereby causing valve 40 to move toward speeder spring 38 with pilot valve 36. In similar fashion, if governor pilot valve 36 were to move toward counterweight unit 30, servo valve 40 would follow for fluid from line 42 would enter annulus 66 through port 112, annulus 68 and line 70. Due to the area ratio between annulus 56 and positioning annulus 66, and the hydraulic forces created therein, substantial force amplification is obtained to move servo valve 40 in response to the movement of pilot valve 36, which pilot valve 36 was caused to move by a relatively small force.

For the reasons discussed previously, governing unit 24 is propeller speed or propeller speed error sensitive since governor pilot valve 36 and hence pitch change servo valve 40 are positioned by the counterweight 30-speeder spring 38 combination in a position proportional to propeller speed (r.p.m.) or propeller speed error.

It is highly desirable, for the purpose of enabling governor anticipation of propeller pitch change requirements for the purpose of speed correction, that our governor also be sensitive to propeller acceleration or propeller speed error rate of change. Since the rate of linear motion or the velocity of pilot valve 36 is indicative of or proportional to propeller acceleration or propeller speed error rate of change, this action of pilot valve is utilized to generate a pilot valve biasing force proportional to propeller acceleration or speed error rate of change to act upon pilot valve 36 in conjunction with the propeller speed or speed error force acting on valve 36 due to the flyweight 30-speeder spring 38 arrangement. Bias generating annulus or chamber 74, which is formed between and defined by stationary wall 76 and skirt 78 of servo valve 40 is utilized in conjunction with restriction 82 to generate a force proportional to the rate of linear movement or velocity of valves 36 and 40 and hence proportional to propeller acceleration or speed error rate of change, and this force is transmitted as a biasing force through aperture 87 into pilot valve biasing cavity 85 to provide a positioning force to pilot valve 36 in conjunction with the positioning force imparted thereto by flyweight 30-speeder spring 38 propeller speed or speed error sensing unit. It should be noted that this biasing or acceleration force works to anticipate speed error correction requirements and to assist servo valve 40 to reach a position which will bring about the speed error correction more rapidly.

Fluid from sump line 72 is admitted through restriction 82 into bias generating annulus 74 and is also admitted into chamber 84 through annuli 86, 88 and line 90.

In a propeller underspeed condition, pilot valve 36 and hence servo valve 40 move toward counterweight unit 30 at a velocity proportional to propeller acceleration or speed error rate of change, thereby reducing the volume of biasing annulus 74 and causing the fluid therefrom to be forced through fixed area restriction 82. Since the rate of fluid flow through restriction 82 is the rate of volume decrease of biasing annulus 74, which is in turn proportional to pilot valve 36 velocity and propeller acceleration, the pressure drop across restriction 82 is also so proportional, and since the pressure change across restriction 82 is also applied across valve 36, through chambers 84 and 85, a biasing force proportional to the velocity of valve 36 and hence propeller acceleration or speed error rate of change is applied across valve 36.

During an overspeed condition, pilot valve 36 and servo valve 40 move toward speeder spring 38, thereby increasing the volume of bias generating annulus 74 at a rate proportional to the velocity of valve 36 and hence the acceleration of propeller 10. This effects a reduction of pressure within bias generating annulus 74 to cause an inflow of fluid from reference area 72 through restriction 82 at a rate proportional to the velocity of pilot valve 36 and servo valve 40 such that the pressure change across restriction 82, which is proportional to pilot valve 36 velocity and hence propeller acceleration or speed error rate of change, is applied as a positioning force into chambers 84 and 85 and hence across pilot valve 36.

It should be noted that the acceleration responsive and proportional pilot valve positioning force is always applied in a manner to expedite propeller off-speed correction.

To avoid the inherent instability, at valve natural frequencies, of our positive feedback system, buffer piston 80 is used but any anti-pressure pulsation, such as a bellows, could as well have been used.

Low pressure regulating valve 91 regulates the pressure drop across the aperture defined by the servo valve 40 at the entrance to high pitch line 60.

For emergency propeller feathering purposes, high pressure fluid may be passed through line 102 into chamber 104 to move valve 40 inwardly.

It will be obvious to all skilled in the art that bias generating chamber 74 could as well have been made volume reducing for a propeller overspeed condition and volume increasing for a propeller underspeed condition and the pilot valve bias generating annulus placed on the other side of the pilot valve than that shown in Fig. 2.

It is to be understood that the invention is not limited to the specific embodiment herein illustrated and described, but may be used in other ways without departure from its spirit as defined by the following claims.

I claim:

1. Apparatus to control the speed of a mechanism including a governor to regulate as a function of mechanism speed and acceleration comprising first valve means movable in response to mechanism speed, second valve means positioned by said first valve means, and mechanism acceleration indicating means responsive to the movement of said second valve means and biasing said first valve means.

2. A constant speed governor comprising first valve means, motive means responsive to speed error positioned to move said first valve means as a function of speed error, second valve means positioned by said first valve means, means responsive to the rate of movement of said second valve to generate a force proportional to speed error rate of change, and means to transmit said force to act upon said first valve means in conjunction with said motive means.

3. A constant speed governor comprising first valve means movable in response to speed, second valve means hydraulically positioned by said first valve means, a hydraulic chamber of volume defined by the position of said second valve means, a restriction communicating with said chamber such that all hydraulic flow into or out of said chamber caused by movement of said second valve means must pass through said restriction, and means to introduce the pressures on each side of said restriction to each side of said first valve means.

4. A constant speed governor comprising first valve means movable in response to speed, second valve means hydraulically positioned by said first valve means, a hydraulic chamber of volume defined by the position of said second valve means, a restriction communicating with said chamber such that all hydraulic flow into or out of said chamber caused by movement of said second valve means must pass through said restriction, means to introduce the pressures on each side of said restriction to each side of said first valve means, and oscillation preventing means associated with said restriction.

5. A propeller constant speed governor comprising first valve means, means responsive to propeller speed error applying a first positioning force to said first valve means proportional to propeller speed error and moving said first valve means at a rate proportional to the rate of change of said propeller speed error, second valve means coaxial with said first valve means, hydraulic means to amplify said first positioning force and position said second valve means in accordance with the position of said first valve means so that said first valve means hydraulically positions said second valve means with amplified force, a hydraulic chamber of volume defined by the position of said second valve means so that the rate of hydraulic fluid flow into and out of said chamber is determined by the rate of movement of said second valve means, fluid conveying means communicating with said chamber and with each end of said first valve means and having a restriction near said chamber and between said first valve means ends through which all hydraulic fluid, into and out of said chamber, must flow so that the pressure drop across said restriction caused by movement of said second valve means and in proportion to the rate of movement thereof is applied across said first valve means as a second positioning force supplemental to said first positioning force.

6. A propeller constant speed governor comprising first valve means, means responsive to propeller speed error applying a first positioning force to said first valve means proportional to propeller speed error and moving said first valve means at a rate proportional to the rate of change of said propeller speed error, second valve means concentric with said first valve means, means to amplify said first positioning force and establish a hydraulic pressure regulatable in response to the movement of said first valve to position said second valve means in accordance with the position of said first valve means so that said first valve means hydraulically positions said second valve means in accordance with the movement of said first valve means and with amplified force, a hydraulic chamber of volume defined by the position of said second valve means and hence said first valve means so that the rate of hydraulic fluid flow into and out of said chamber is determined by the rate of movement of said second valve means and hence said first valve means, fluid conveying means communicating with said chamber and with each end of said first valve means and having a restriction between said first valve means ends through which all hydraulic fluid, into and out of said chamber, must flow so that the pressure drop across said restriction caused by movement of said first and second valve means and in proportion to the rate of movement thereof is applied across said first valve means as a second positioning force supplemental to said first positioning force.

References Cited in the file of this patent
UNITED STATES PATENTS

| | | |
|---|---|---|
| 823,567 | Waters | June 19, 1906 |
| 1,096,942 | Owens | May 19, 1914 |
| 1,126,900 | Stachel | Feb. 2, 1915 |
| 2,346,856 | Martin | Apr. 18, 1944 |
| 2,364,817 | Reggio | Dec. 12, 1944 |
| 2,456,747 | Snader et al. | Dec. 21, 1948 |
| 2,472,181 | Werth | June 7, 1949 |
| 2,478,752 | Drake | Aug. 9, 1949 |
| 2,544,131 | Brandes | Mar. 6, 1951 |
| 2,613,072 | Carson et al. | Oct. 7, 1952 |
| 2,623,600 | Rhines et al. | Dec. 30, 1952 |
| 2,663,373 | Richmond | Dec. 22, 1953 |
| 2,737,962 | Almeras | Mar. 13, 1956 |
| 2,755,078 | Chillson | July 17, 1956 |
| 2,840,094 | Taplin | June 24, 1958 |